April 8, 1941.  M. J. HOOD  2,237,306
ANGLE-OF-ATTACK INDICATOR
Filed Sept. 9, 1939
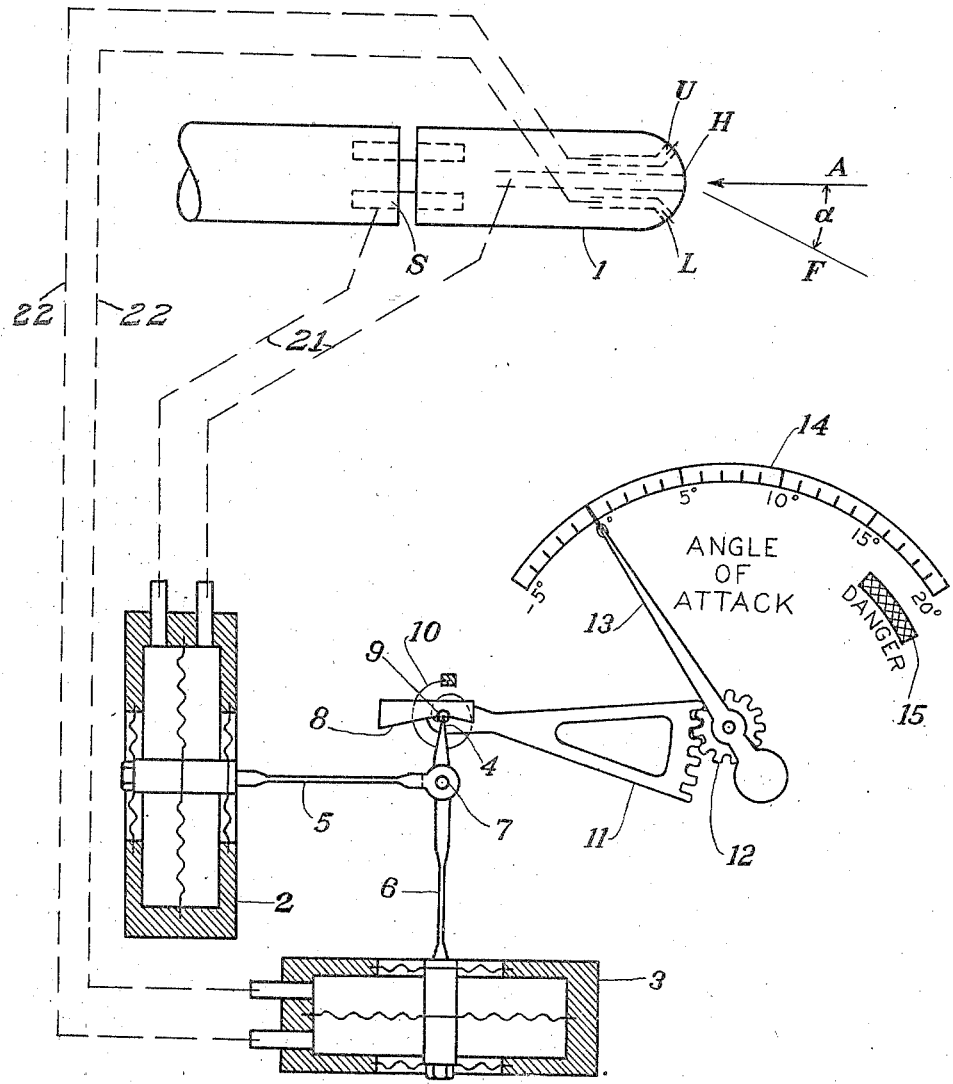
INVENTOR.
*M. J. Hood*
BY
*Weston Jones*
ATTORNEY.

Patented Apr. 8, 1941

2,237,306

UNITED STATES PATENT OFFICE 2,237,306

ANGLE-OF-ATTACK INDICATOR

Manley J. Hood, Langley Field, Va.

Application September 9, 1939, Serial No. 294,107

6 Claims. (Cl. 73—180)

(Granted under the act of March 3, 1883, as amended April 30, 1928; 370 O. G. 757)

This invention relates to an angle-of-attack indicator for airplanes and has for an object to provide an indicator for the angle-of-attack of the airplane and thereby warn the pilot how far the airplane is from the stalled attitude, thus serving as a stall-warning device.

A further object of this invention is to provide an angle-of-attack indicator or stall-warning device which will operate at any speed, for many modern airplanes stall suddenly and dangerously without giving the pilot any warning. In flying such airplanes at low speed, as when preparing to land, pilots often use the air-speed indicator to give them some idea of how closely they are approaching the stall. The speed at which an airplane stalls, however, varies with wing loading which in turn varies with the weight of the payload and fuel load and with acceleration. Therefore, the air-speed indicator cannot be a satisfactory stall indicator. An angle-of-attack indicator, as herein provided, acts as a stall-warning device because it always shows how far the airplane is from the stalled attitude.

In order that seaplanes may take off in the shortest possible distance it is necessary that the trim be maintained at the optimum angle within close limits throughout the take-off run. A proper trim-angle indicator has already been developed but will not function except when there is a clearly visible horizon. An angle-of-attack indicator according to this invention will show the trim angle during the take-off and will function in all weather.

It is thus a further object of this invention to provide an angle-of-attack indicator which will perform the functions of both a stall indicator and a trim indicator more completely than is possible with the present separate instruments and in addition will show the angle-of-attack at all times, thus adding to the safety and economy of aircraft operation.

With the foregoing and other objects in view, the invention consists in the construction, combination and arrangement of parts hereinafter described and illustrated in the drawing, in which the figure is a diagrammatic view of the angle-of-attack indicator of this invention.

A head 1 consists of a conventional Pitot static tube in combination with a conventional "yaw head," in this case so oriented as to be responsive to angle of pitch or inclination in a vertical plane. Pitot or impact pressure opening H and static opening S are connected by tubes 21 to a bellows type of instrument 2, which when in action responds to the impact pressure of the air flow by a deflection $q$ proportional in magnitude to the magnitude of the impact pressure at H minus the static pressure at S. The angle orifices at U and L corresponding to the yaw head part of the instrument respond to an angularity between the axis A of the tube and the air flow F by experiencing a pressure difference $P_U - P_L$. A bellows instrument 3 similar to 2 responds to the pressure difference P in the angle orifices U and L through tubes 22 by deflecting an amount proportional to the pressure difference P existing in the angle orifices U and L. This pressure difference is, however, proportional to a function of the angularity of the instrument to the air stream multiplied by the impact pressure of the air flow. Thus the impact spindle 5 experiences a deflection proportional in magnitude to the magnitude of the impact pressure, while the angle spindle 6, to which impact spindle 5 is connected at 7, experiences a deflection proportional in magnitude to the angularity between the axis A of the head and the direction of air stream F multiplied by the impact pressure of the air. Since the purpose of this instrument is to determine the angle, the instrument will measure angle directly if a means is supplied to divide the latter deflection by the former deflection that is, $P/q$. Such a means is shown and constitutes the inventive feature claimed in this application.

This process is accomplished as follows: A stylus 4 rides on the surface of a curved platen 8 urged about a pivot 9 by hair spring 10, the arrangement being so adjusted that the impact deflection P of pressure cell 2 is parallel to the surface of the platen 8 and in a direction perpendicular to the axis of its pivot 9.

The platen 8 is curved with a radius equal to the length of angle spindle 6. The platen 8 is mounted on a gear sector 11 meshed with a gear 12 which carries an indicator pointer 13 over the angle-of-attack calibrated scale 14. In addition to the calibrations, one end of the scale is provided with a danger marking 15. At zero deflection of the impact spindle 5 the stylus 4 riding on the platen 8 coincides with the pivot 9. Then as impact pressure is applied, the stylus 4 moves away from the pivot 9 along the surface of the platen 8 by an amount P proportional to the impact pressure less the static pressure. The angle spindle rod 6 produces a movement of the stylus 4 as it moves on the platen 8 in a direction perpendicular to the face of the platen 8, thus tipping the platen 8 about its pivot 9. The angle through which the platen 8 is tipped against its hair spring 10, so long as relatively small angularities are encountered, is proportional to the perpendicular motion of the angle spindle 6 divided by the parallel motion of the impact spindle 5. This is in accordance with well-known trigonometric relations. This mechanism then accomplishes the desired object of dividing the deflection of the angle spindle by the deflection of the impact spindle, or in effect it divides the product of angularity times impact pressure by impact pressure; thus resulting in an angular deflection of a platen proportional in magnitude to the angularity of the axis of the Pitot head to the air stream.

This invention may also be arranged to indicate the angle of yaw by placing the angle orifices in a horizontal instead of a vertical plane as shown and the phrase "angle of attack" in the appended claims covers both the horizontal as well as the vertical plane. The head 1 must be located outside the field affected by the airplane propellor and the instrument must be calibrated to compensate for the effect of the airplane on the angle and speed of the air flow.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An angle-of-attack indicator for aircraft comprising a pressure head and a yaw head, said pressure head having impact and static pressure openings, said yaw head having angle openings in which are pressures responsive to the angle of pitch of the aircraft, means including a first spindle movable in one direction in proportion to the difference between the impact pressure and the static pressure on said pressure head, means including a second spindle movable in proportion to the difference in pressure in the angle openings of the yaw head, said second spindle being secured to said first spindle at right angles thereto and a stylus movable according to the combined motions of said two spindles.

2. An angle-of-attack indicator for aircraft comprising a pressure head and a yaw head, said pressure head having impact and static pressure openings, said yaw head having angle openings in which are pressures responsive to the angle of pitch of the aircraft, means including a first spindle movable in one direction in proportion to the difference between the impact pressure and the static pressure on said pressure head, means including a second spindle movable in proportion to the difference in pressure in the angle openings of the yaw head, said second spindle being secured to said first spindle at right angles thereto a stylus movable according to the combined motions of said two spindles, a pivoted platen, means yieldably permitting said platen to rotate about its pivot from zero position, said stylus bearing against said platen to cause rotation from zero position in proportion to the motion of said stylus.

3. An angle-of-attack indicator for aircraft comprising a pressure head and a yaw head, said pressure head having impact and static pressure openings, said yaw head having angle openings in which are pressures responsive to the angle of pitch of the aircraft, means including a first spindle movable in one direction in proportion to the difference between the impact pressure and the static pressure on said pressure head, means including a second spindle movable in proportion to the difference in pressure in the angle openings of the yaw head, said second spindle being secured to said first spindle at right angles thereto, a stylus movable according to the combined motions of said two spindles, a pivoted platen, means yieldably permitting said platen to rotate about its pivot and urging its return to zero position, said stylus bearing against said platen to cause rotation from zero position in proportion to the motion of said stylus, an indicator connected to said platen and an angle indicating means over which said indicator is moved by said platen to indicate the angle of attack of the aircraft.

4. A stall indicator for aircraft comprising a pressure head having impact pressure and static pressure openings therein, a yaw head having angle openings therein in which are pressures responsive to the angle of pitch of the aircraft, a pressure cell, a diaphragm in said cell having its opposite sides responsive to the impact pressure and static pressure in said pressure head openings, a spindle movable by said diaphragm, a second pressure cell, a diaphragm in said second pressure cell having its opposite sides responsive to the pressure in the angle openings of the yaw head, a second spindle movable by said second diaphragm, said second spindle having its axis located at right angles to the axis of said first spindle, a stylus mounted on one of said spindles responsive to the combined motions of said two spindles.

5. A stall indicator for aircraft comprising a pressure head having impact pressure and static pressure openings therein, a yaw head having angle openings therein in which are pressures responsive to the angle of pitch of the aircraft, a pressure cell, a diaphragm in said cell having its opposite sides responsive to the impact pressure and static pressure in said pressure head openings, a spindle movable by said diaphragm, a second pressure cell, a diaphragm in said second pressure cell having its opposite sides responsive to the pressure in the angle openings of the yaw head, a second spindle movable by said second diaphragm, said second spindle having its axis located at right angles to the axis of said first spindle, a stylus mounted on said second spindle responsive to the combined motions of said two spindles, a pivoted platen, yieldable means urging said pivoted platen to bear against the stylus and an indicator actuated by said platen movable according to the motion of said stylus.

6. A stall indicator for aircraft comprising a pressure head having impact pressure and static pressure openings therein, a yaw head having angle openings therein in which are pressures responsive to the angle of pitch of the aircraft, a pressure cell, a diaphragm in said cell having its opposite sides responsive to the impact pressure and static pressure in said pressure head openings, a spindle movable by said diaphragm, a second pressure cell, a diaphragm in said second pressure cell having its opposite sides responsive to the pressure in the angle openings of the yaw head, a second spindle movable by said second diaphragm, said second spindle having its axis located at right angles to the axis of said first spindle, a stylus mounted on said second spindle responsive to the combined motions of said two spindles, a pivoted platen, yieldable means urging said pivoted platen to bear against the stylus, an indicator actuated by said platen movable according to the motion of said stylus, a gear sector on which said platen is mounted, and a gear in mesh with said sector, said indicator being mounted on said gear.

MANLEY J. HOOD.